(12) United States Patent
Zhang et al.

(10) Patent No.: US 9,261,610 B2
(45) Date of Patent: Feb. 16, 2016

(54) HIGH PURITY GERMANIUM DETECTOR

(71) Applicant: Nuctech Company Limited, Beijing (CN)

(72) Inventors: Qingjun Zhang, Beijing (CN); Yuanjing Li, Beijing (CN); Zhiqiang Chen, Beijing (CN); Yulan Li, Beijing (CN); Qiufeng Ma, Beijing (CN); Ziran Zhao, Beijing (CN); Yinong Liu, Beijing (CN); Jianping Chang, Beijing (CN)

(73) Assignee: Nuctech Company Limited, Beijing (CN)

( * ) Notice: Subject to any disclaimer, the term of this patent is extended or adjusted under 35 U.S.C. 154(b) by 0 days.

(21) Appl. No.: 14/574,848

(22) Filed: Dec. 18, 2014

(65) Prior Publication Data
US 2015/0219773 A1 Aug. 6, 2015

(30) Foreign Application Priority Data

Dec. 27, 2013 (CN) .......................... 2013 1 0741367

(51) Int. Cl.
*G01T 1/24* (2006.01)
*G01T 1/36* (2006.01)

(52) U.S. Cl.
CPC . *G01T 1/244* (2013.01); *G01T 1/24* (2013.01); *G01T 1/241* (2013.01); *G01T 1/366* (2013.01)

(58) Field of Classification Search
CPC .................................. G01T 1/24; G01T 1/366
See application file for complete search history.

(56) References Cited

U.S. PATENT DOCUMENTS

| | | | | |
|---|---|---|---|---|
| 6,002,134 A | * | 12/1999 | Lingren | ............ H01L 27/14659 250/370.01 |
| 6,037,595 A | * | 3/2000 | Lingren | ................. G01T 1/241 250/370.01 |
| 8,575,750 B1 | * | 11/2013 | Zhou et al. | ..................... 257/741 |
| 2011/0298131 A1 | * | 12/2011 | Hull et al. | ..................... 257/741 |
| 2013/0297229 A1 | * | 11/2013 | CHO et al. | ...................... 702/30 |
| 2013/0341752 A1 | * | 12/2013 | Kostamo | ....................... 257/490 |

FOREIGN PATENT DOCUMENTS

JP        62180286 A  *  8/1987 ................ G01T 1/24

OTHER PUBLICATIONS

Birkenback et al., "Determination of spce charge distributions in highly segmented large volume HPGe detectors from capacitance-voltage measurements," 2011, Nuclear Instruments and Methods in Physics Research A, vol. 640, pp. 176-184.*

* cited by examiner

*Primary Examiner* — Kiho Kim
(74) *Attorney, Agent, or Firm* — Westman, Champlin & Koehler, P.A.

(57) ABSTRACT

The present disclosure provides a High-Purity Germanium (HPGe) detector, comprising: a HPGe single crystal having an intrinsic region exposed surface; a first electrode and a second electrode connected to a first contact electrode and a second contact electrode of the HPGe single crystal respectively; and a conductive guard ring arranged in the intrinsic region exposed surface around the first electrode to separate the intrinsic region exposed surface into an inner region and an outer region. A leakage current derived from the intrinsic region exposed surface of the HPGe detector can be separated from the current of the HPGe detector by the conductive guard ring provided in the surface, thereby suppressing the interference of the surface leakage current.

12 Claims, 4 Drawing Sheets

HIGH PURITY GERMANIUM DETECTOR

CROSS-REFERENCE TO RELATED APPLICATION

This application claims the benefit of Chinese Patent Application No. 201310741367.4 filed on Dec. 27, 2013 in the State Intellectual Property Office of China, the whole disclosure of which is incorporated herein by reference.

BACKGROUND OF THE INVENTION

1. Field of the Invention

The present disclosure generally relates to the field of semiconductor radiation detectors, and more particularly, to High-Purity Germanium (HPGe) detectors.

2. Description of the Related Art

With continuous development of the semiconductor manufacturing technology, a single crystal of HPGe with a large volume and good performance has been produced successfully such that HPGe detectors possess good energy resolution and relatively high detection efficiency. The HPGe detector may be used for, for example, measuring Gamma-rays, X-rays, detecting dark matter, radiation imaging techniques and the like. It has been applied widely in applications such as decay scheme research, internal conversion coefficient measurement, neutral reaction, short lifetime neutral measurement, activation analysis, neutral fuel research, mines detection, fine structure research of atomic nucleus, dark matter detection and the like.

Noise from the detector itself is one of the crucial factors restricting the energy resolution of the HPGe detector. The noise is mainly derived from the reverse leakage current and directly affects the energy resolution and sensitivity of the detector. In addition, detection of the reverse leakage current is an easy method for identifying process and determining the quality of products. Generally, a good HPGe detector should have the reserve leakage current less than 10 pA. However, it is not easy to reduce the reverse leakage current into this level; therefore, many researchers for detectors do a great deal of work on reduction of the reverse leakage current.

The reverse leakage current has three sources, i.e., bulk leakage current, diffusion leakage current and surface leakage current.

The bulk leakage current is current caused by electrons and holes generated by thermal activation. As the HPGe single crystal has a small energy band gap, in order to improve the resolution, HPGe detectors may be cooled into a temperature range from 70K to 100K in practice. Within the temperature range, the bulk leakage current may be negligible. The diffusion leakage current is current caused by doping contact. In case that minority of carriers has a very long lifetime, the diffusion current will not change as the reverse voltage varies, and thus may also be negligible. The surface leakage current is current related to a surface state of HPGe single crystal after packaging process and is generated at a surface layer. Typically, the surface leakage current is increased as the reverse voltage increases. Thus, the surface leakage current cannot be neglected, and is the main source of the leakage current of the detectors.

In the prior arts of reducing the surface leakage current of the detectors, the most direct and most important scheme is a surface cleaning method, in which a great deal of complex procedures are used to clean an ideal surface to keep the surface in a state of high resistance strictly. However, even if the strictest cleaning has been done in advance, as the crystal lattice terminates at the crystal surface, each germanium atom in the outmost layer of the surface will have one unmated electron, i.e., have an unsaturated bond. Due to these unsaturated bonds, the practical crystal surface often may be formed with a tiny oxidation film or may adsorb other atoms or molecules thereon, which makes the surface configuration complicated. In accordance with research, the clean surface without adsorbing any atoms or molecules will be remained in a short time even in high vacuum, and after a few hours, the surface will be formed with a single layer of atoms thereon. Besides the surface state caused by the above surface dangling bond, the surface states caused due to factors such as crystal defects or adsorption of various charged particles are also present in the surface. Factors such as the adsorbed various particles, mobile ions, fixed charges and traps in the oxidation layer of the surface may cause the reduction of the surface resistance of HPGe semiconductors, thus an electrical field is generated in the surface layer. These factors will adversely influence the features on the surface of the semiconductor significantly, in particular increase the surface leakage current, resulting in resolution reduction and dummy signals.

Another technology for reducing the surface leakage current of the detectors is surface passivation technology, i.e., a layer of passivation film having a function of blocking charged particles, such as amorphous germanium film, germanium oxide film or germanium dioxide film, is deposited on the clean HPGe semiconductor surface. The passivation technology has a positive effect on controlling the surface leakage current.

SUMMARY OF THE INVENTION

An embodiment of the present invention provides a HPGe detector, comprising:

a HPGe single crystal having an intrinsic region exposed surface;

a first electrode and a second electrode connected to a first contact electrode and a second contact electrode of the HPGe single crystal respectively; and a conductive guard ring arranged in the intrinsic region exposed surface around the first electrode to separate the intrinsic region exposed surface into an inner region and an outer region.

DETAILED DESCRIPTION OF PREFERRED EMBODIMENTS OF THE INVENTION

Figure 1A:
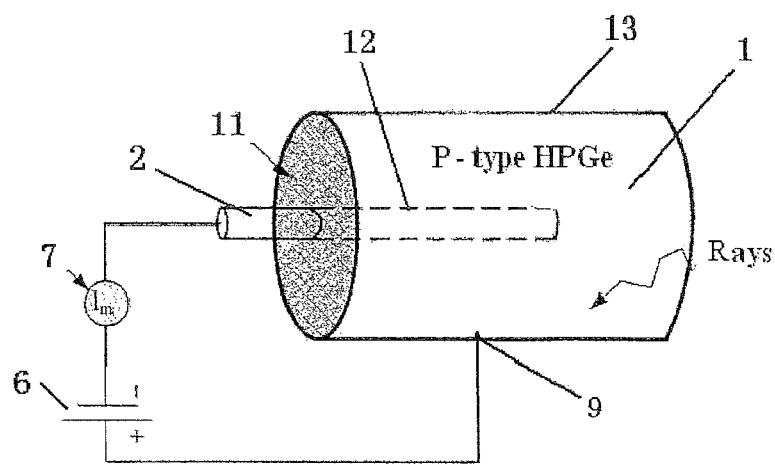
FIGS. 1A and 1B are respectively a structural schematic view and an equivalent circuit diagram of a P-type coaxial HPGe detector in prior arts.

Exemplary embodiments of the present invention will be described hereinafter in detail with reference to the attached drawings, wherein the like reference numerals refer to the like elements. The present invention may, however, be embodied in many different forms and should not be construed as being limited to the embodiment set forth herein; rather, these embodiments are provided so that the present invention will be thorough and complete, and will fully convey the concept of the disclosure to those skilled in the art.

Figure 1B:
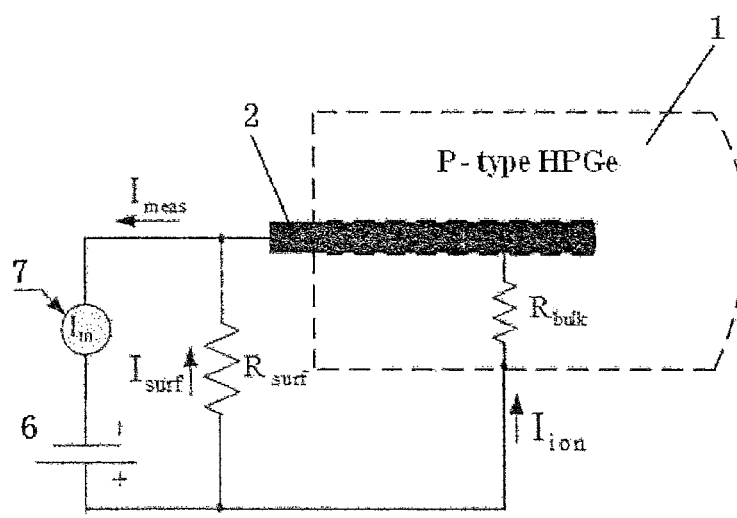

FIGS. 1A and 1B are respectively a structural schematic view and an equivalent circuit diagram of a P-type coaxial HPGe detector in the prior arts. The HPGe detector includes an HPGe single crystal 1 and a first electrode 2. The HPGe single crystal 1 has an intrinsic region exposed surface 11 and a first contact electrode 12 connected to the first electrode 2. In the coaxial type HPGe detector, the intrinsic region exposed surface 11 is an end face of the HPGe single crystal 1. Typically, the HPGe single crystal 1 may have a cylindrical shape. The HPGe detector may further be provided with a second electrode 9 connected to a second contact electrode 13 of the HPGe single crystal 1. In an example, the second contact electrode 13 is an outer circumferential surface of the HPGe single crystal 1. The first electrode 2 may be electrically connected to the low voltage side of a power supply 6 and the outer circumferential surface of the HPGe single crystal 1 is electrically connected to the high voltage side of the power supply 6. In practice, circuit units such as amplification circuits between the first electrode 2 and the low voltage side of the power supply 6 are often needed to improve the detection accuracy and stability. For the sake of convenient description, these circuit units are omitted herein, and only a galvanometer 7 is shown.

The basic principle of the HPGe detector is described as follows: a voltage is applied to both electrodes of the HPGe single crystal to form an electrical field therebetween; when the incident Gamma radiation and X-rays enter the intrinsic region, electron-cavity pairs will be produced to form an ion current under the electrical field. The energy detection of the radiation irradiated on the HPGe detector may be done by detecting the ion current. That is, the HPGe detector converts the energy detection of the radiation ray into the detection of the ion current $I_{ion}$. The HPGe single crystal has the intrinsic region. The so-called intrinsic region means a region in which the above ion effect can be produced. The intrinsic region exposed surface means a surface of the intrinsic region exposed to the outside, which may be contaminated or passivated. As an example, in FIGS. 1A to 1D, the detection of the ion current $I_{ion}$ is done by the galvanometer 7. As shown in FIG. 1B, the internal resistance of the HPGe single crystal 1 is represented by $R_{bulk}$; the surface resistance of the intrinsic region exposed surface 11 is represented by $R_{surf}$; and the surface leakage current across the surface resistance is $I_{surf}$. In this way, in the HPGe detector in prior arts, the detection current, detected by the galvanometer 7, $I_{meas}=I_{ion}+I_{surf}$, where $I_{ion}$ is a desired current signal representing the energy of radiation and the surface leakage current $I_{surf}$ is an interfering signal. As the intrinsic region exposed surface 11 is exposed, it is easy to be contaminated and the contaminated local portion has a relative small surface resistance $R_{surf}$, thus the surface leakage current $I_{surf}$ has larger amplitude. Thus, the measure current $I_{meas}$ may be influenced significantly.

Figure 1C:
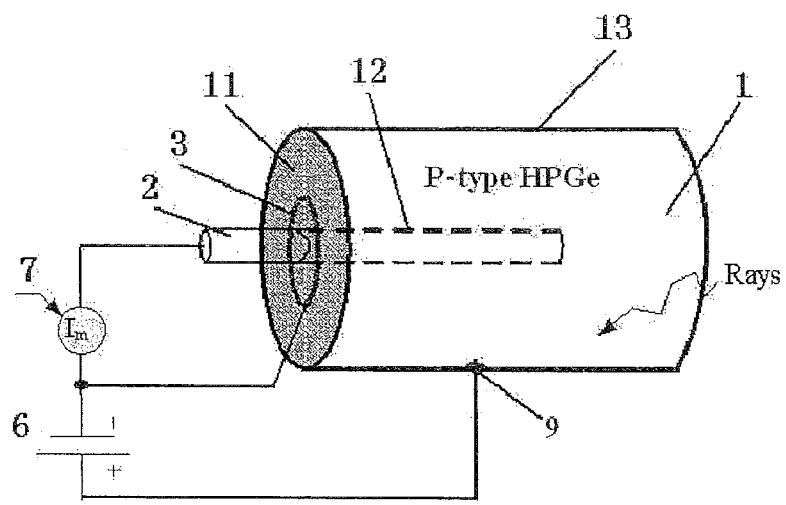
FIGS. 1C and 1D show an HPGe detector with a conductive guard ring according to an embodiment of the present invention.
Figure 1D:
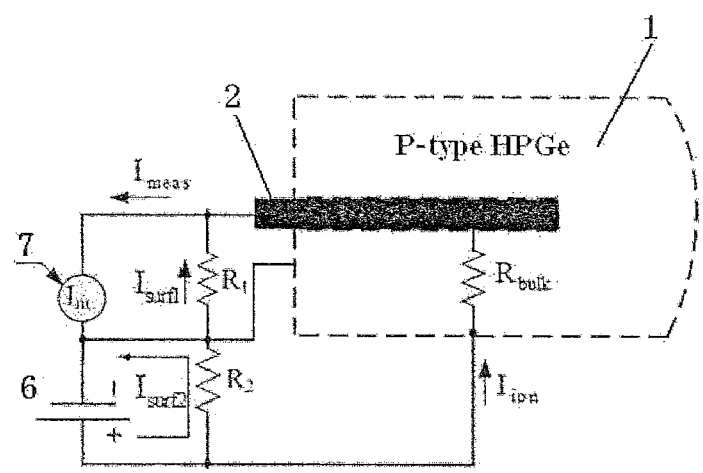

FIGS. 1C and 1D show an HPGe detector with a conductive guard ring according to an embodiment of the present invention. In comparison with FIGS. 1A and 1B, the HPGe detector according to this embodiment of the invention is distinguished from the prior art HPGe detector mainly in that it has the conductive guard ring 3. The conductive guard ring 3 is arranged in the intrinsic region exposed surface 11 around the first electrode 2. The conductive guard ring 3 separates the intrinsic region exposed surface 11 into an inner region and an outer region. The surface resistance of the inner region surrounded by the conductive guard ring 3 is represented by $R_1$. The surface resistance of the outer region of the intrinsic region exposed surface 11 outside of the conductive guard ring 3 is represented by $R_2$. It is desired that the thickness of the conductive guard ring 3 may separate the intrinsic region exposed surface 11 completely into two regions, i.e., the inner region and the outer region. The conductive guard ring 3 is electrically connected to the side of the galvanometer 7 close to the low voltage side of the power supply. In this case, the surface leakage currents corresponding to the surface resistances $R_1$ and $R_2$ of the two regions respectively are $I_{surf1}$ and $I_{surf2}$. $I_{surf2}$ will not flow through the galvanometer 7. Thus, it will not influence the detection current $I_{meas}$. That is, the surface leakage current caused by the power supply 6 is separated from the detection current. For $I_{surf1}$, as the voltages at both ends of the surface resistance $R_1$ (i.e., the first electrode 2 and the conductive conductive guard ring 3) have a tiny difference or are substantially the same, the surface leakage current $I_{surf1}$ of the inner region surrounded by the conductive guard ring 3 will also be very small. For example, the voltage drop across the surface resistance $R_1$ measured by an electrometer or a picoammeter is less than 1 mV. Thus, the surface leakage current $I_{surf1}$ produced across the $R_1$ is substantially small. And in the practical detector device, the detection signal generally needs to be inputted into a junction field-effect transistor (JFET) to be amplified. The input end of the JFET has a lower voltage drop, typically less than 100 μV, thus it produces a smaller current $I_{surf1}$. In this way, almost all of the detection current $I_{meas}$ through the galvanometer 7 is the desired ion current $I_{ion}$.

It can be known from the above that use of the arrangement of the conductive guard ring 3 may efficiently suppress the adverse influence of the surface leakage current on the detection current of the HPGe detector.

Figure 2A:
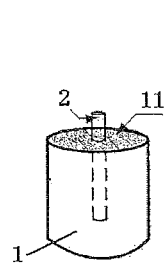
FIGS. 2A to 2C show schematically structural views of a coaxial type HPGe detector in accordance with embodiments of the present invention.
Figure 2B:
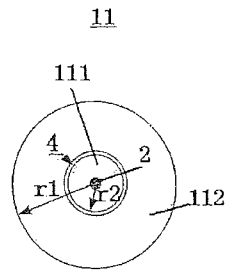
Figure 2C:
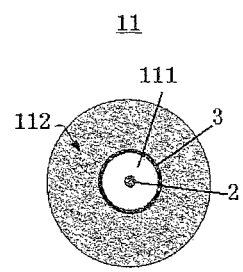
Figure 3A:
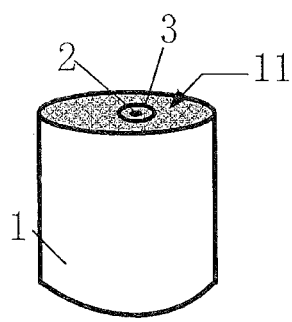
FIGS. 3A to 3C show schematically structural views of a point electrode type HPGe detector in accordance with embodiments of the present invention.
Figure 3B:
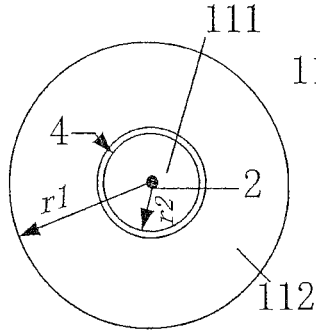
Figure 3C:
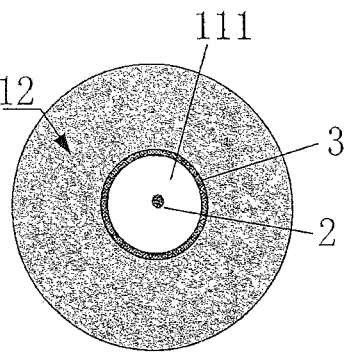
Figures 4A, 4B, 4C:
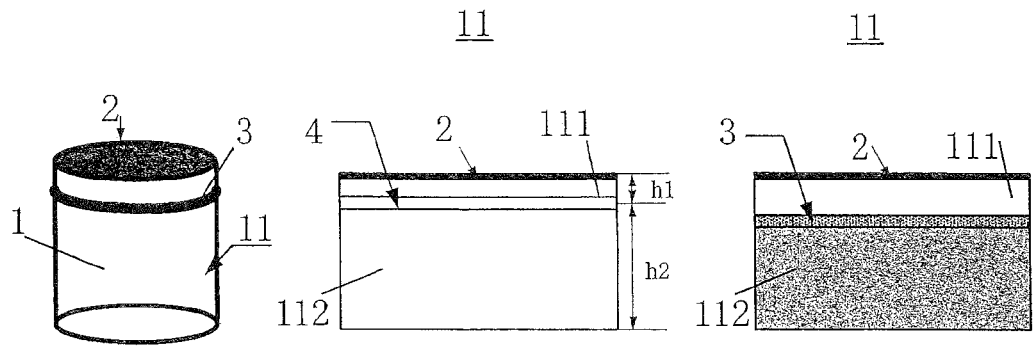
FIGS. 4A to 4C show schematically structural views of a plane type HPGe detector in accordance with embodiments of the present invention.

FIGS. 2A-C, 3A-C and 4A-C show schematically structures of the HPGe detector according to embodiments of the present invention. FIGS. 2A-C show a coaxial type HPGe detector. FIGS. 3A-C show a point electrode type HPGe detector. FIGS. 4A-C show a plane type HPGe detector. At first, the coaxial type HPGe detector shown in FIGS. 2A-C will be discussed. FIG. 2A shows the HPGe single crystal 1 connected with the first electrode 2, the HPGe single crystal 1 has the intrinsic region exposed surface 11 (or called as a high resistance surface) (the conductive guard ring 3 is not shown). In order to arrange the conductive guard ring 3 conveniently, a groove 4 surrounding the first electrode 2 may be arranged in the intrinsic region exposed surface 11, for example it can be formed by an etching process. As illustrated in FIG. 2B, the conductive guard ring 3 may be arranged in the groove 4. For example, the conductive guard ring 3 may be a metal solid ring. The meal solid ring may match with the groove 4 in size to be embedded in the groove 4. Or, for example, the conductive guard ring 3 may also be in form of a plated metal layer. The metal may be, for example, copper, gold, silver or the like. However, the conductive guard ring 3 is not limited to metal materials. Instead, non-metal conductive materials may also be used to produce the conductive guard ring 3. FIG. 2B is a front view showing the intrinsic region exposed surface 11 with the groove 4. FIG. 2C is a front view showing the intrinsic region exposed surface 11 with the groove 4 in which the conductive guard ring 3 has been embedded.

As an example, the groove 4 may have a width less than 200 micrometers or less than 100 micrometers, or less than 50 micrometers, or less than 10 micrometers or less than 1 micrometer. The groove 4 has a depth which ensures the intrinsic region exposed surface 11 that may be contaminated or have defects to be separated sufficiently by the conductive guard ring 3 into the inner region 111 and the outer region 112. As an example, the depth of the groove 4 may be between 1 micrometer and 10 micrometers. As an example, the conductive guard ring 3 may be configured such that the conductive guard ring 3 and the first electrode 2 have substantially the same electric potential.

Figure 5:
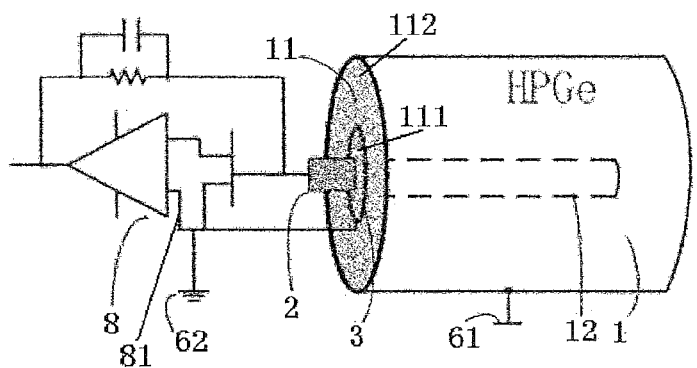
FIG. 5 shows schematically an electrical connection view of the HPGe detector in accordance with an embodiment of the present invention.

In an example, as shown in FIG. 5, the HPGe detector may further include a preamplification circuit 8. The conductive guard ring 3 and a high resistance input 81 of the preamplification circuit 8 are electrically connected to each other and have a same voltage. In this way, the ion current lead from the first electrode 2 is separated from the surface leakage current produced by the high voltage source 61 (or the high voltage side of the power supply 6). There is a high insulation resistance between the conductive guard ring 3 and the first electrode 2. And the conductive guard ring 3 and the first electrode 2 are almost at the same voltage. Therefore, the surface leakage current between them is tiny. In an example, the high resistance input 81 of the preamplification circuit 8 may be electrically connected to the low voltage side of the power supply 6 or a grounding line 62.

In an example, in case that the HPGe detector is the P-type coaxial HPGe detector, the intrinsic region exposed surface 11 is an end face of the HPGe detector, the first electrode 2 extends out from a central hole of the end face, and the conductive guard ring 3 is close to the first electrode 2 and electrically insulated from the first electrode 2. As the guard ring 3 is close to the first electrode 2, it may enlarge the area of the guarded intrinsic region, i.e., the outer region 112 of the intrinsic region exposed surface 11. The inner region 111 of the intrinsic region exposed surface 11 may have a reduced sensitivity due to the near potentials of the conductive guard ring 3 and the first electrode 2 so as to suppress the surface leakage current. As the surface resistance of the area of the intrinsic region exposed surface 11 outside of the conductive guard ring 3 does not influence the detection current, it is desired that the area of the intrinsic region exposed surface 11 outside of the conductive guard ring 3 is as large as possible such that more locations with low surface resistances fall out of the conductive guard ring 3. As an example, the ratio of radius r2 of the conductive guard ring 3 to radius r1 of the end face is less than or equal to 1/3. Certainly, it is not necessary. Instead, the range of area of the guarded intrinsic region may also be enlarged suitably as required, for example, the ratio of radius r2 of the conductive guard ring 3 to radius r1 of the end face may be less than or equal to 1/2. The skilled person in the art would appreciate that any embodiments containing the intrinsic region to be guarded by the conductive guard ring 3, in spite of its area, will fall within the scope of the present invention.

In an example, the conductive guard ring 3 has a center substantially in coincidence with the center of the end face, as illustrated in FIGS. 2A-C.

FIGS. 3A-C show the point electrode type HPGe detector. The point electrode type HPGe detector is distinguished from the above coaxial type HPGe detector only in that the first electrode 2 of the point electrode type HPGe detector is arranged directly at the central point on the end face of the HPGe crystal as the intrinsic region exposed surface 11, instead of being inserted into the central hole of the end face as in the coaxial type HPGe detector shown in FIGS. 2A-C. Therefore, various features in the above coaxial type high purity type germanium detector, for example the conductive guard ring 3, the groove 4, may be used directly in the point electrode type HPGe detector.

FIGS. 4A-C show the plane type HPGe detector. It is distinguished from the above coaxial type HPGe detector in that the first electrode 2 is in a form of plane and the first electrode and the second electrode 9 are arranged on two end faces of the HPGe single crystal respectively. The two end faces of the HPGe single crystal form two contact electrodes respectively and the outer circumferential surface of the HPGe single crystal 1 forms the intrinsic region exposed surface 11. In the plane type HPGe detector according to an embodiment of the present invention, the conductive guard ring 3 is arranged on the outer circumferential surface of the HPGe single crystal 1, as shown in FIGS. 4A-C. As the first electrode 2 is arranged on the upper end face of the HPGe single crystal 1, the conductive guard ring 3 on the outer circumferential surface of the HPGe single crystal 1 may still be considered to surround the first electrode 2. The conductive guard ring 3 also separates the intrinsic region exposed surface 11 into the inner region 111 and the outer region 112. In the embodiment, the inner region 111 is the portion (with height of h1, as shown in FIG. 4B) of the intrinsic region exposed surface 11 between the conductive guard ring 3 and the first electrode 2; and the outer region 112 is the portion (with height of h2, as shown in FIG. 4B) of the intrinsic region exposed surface 11 between the conductive guard ring 3 and another end face in opposite to the end face provided with the first electrode 2. For the sake of showing the intrinsic region exposed surface 11 more clearly; FIGS. 4B and 4C show the spread outer circumferential surface of the HPGe single crystal 1.

Similar to the coaxial type HPGe detector, in the plane type HPGe detector according to the embodiment of the present invention, the conductive guard ring 3 may also be close to the first electrode 2 and electrically insulated from the first electrode 2 such that the area of the guarded intrinsic region can be enlarged as much as possible. For example, the conductive guard ring 3 may be located such that the intrinsic region exposed surface 11 has the area between the conductive guard ring 3 and the first electrode 2, which is less than or equal to 1/3 of total area of the intrinsic region exposed surface 11. Certainly, it is not necessary. Instead, the area of the intrinsic region exposed surface 11 between the conductive guard ring 3 and the first electrode 2 may be less than or equal to 1/2 of the total area of the intrinsic region exposed surface 11. The skilled person in the art would appreciate that any embodiments containing the intrinsic region to be guarded by the conductive guard ring 3, in spite of its area, will fall within the scope of the present invention.

In an example, for the plane type HPGe detector, the conductive guard ring 3 may be substantially perpendicular to an axis of the HPGe single crystal 1. It should be noted that although the plane type HPGe detector is slightly different from the coaxial type HPGe detector in structure, various features in the above coaxial type HPGe detector, for example the groove 4, the metal solid ring or conductive layer used as the conductive guard ring 3, may be used in the plane type HPGe detector in a similar manner.

It should be noted that although the coaxial type, point electrode type and plane type HPGe detector have different structures, they are all connected to the circuit by the first electrode and the second electrode 9 and they have the same basic working principle and the same function. Therefore, the circuit principles, structures and elements for the HPGe detector explained with reference to the coaxial type HPGe detector may also be applied in the point electrode type and plane type HPGe detectors.

Although the HPGe single crystal 1 has the cylindrical shape as shown in FIGS. 2A-C, 3A-C and 4A-C, the present invention is not limited to this. Instead, the HPGe single crystal 1 may have other shapes, for example a through going shaft with double exposed ends or cuboid.

In the HPGe detector according to an embodiment of the present invention, the HPGe single crystal 1 may be P-type HPGe single crystal, or may be N-type single crystal. For the P-type single crystal, the intrinsic region exposed surface 11 may be called as P surface. In contrast, for the N-type single crystal, the intrinsic region exposed surface 11 may be called as N surface.

Although the present invention has been explained with reference to the drawings, the embodiments shown in the drawings are only illustrative, instead of limiting the present invention.

Although some embodiments of the general inventive concept are illustrated and explained, it would be appreciated by those skilled in the art that modifications and variations may be made in these embodiments without departing from the principles and spirit of the general inventive concept of the disclosure, the scope of which is defined in the appended claims and their equivalents.

What is claimed is:

1. An HPGe detector, comprising:
   an HPGe single crystal having an intrinsic region exposed surface;
   a first electrode and a second electrode connected to a first contact electrode and a second contact electrode of the HPGe single crystal respectively; and
   a conductive guard ring arranged in the intrinsic region exposed surface around the first electrode to separate the intrinsic region exposed surface into an inner region and an outer region,
   wherein the HPGe single crystal is a coaxial type detector or a point electrode type detector, and
   the intrinsic region exposed surface is an end face of the HPGe single crystal, the first electrode being connected to the first contact electrode at a central hole or a central point of the end face, the second electrode being connected to an outer circumferential surface of the HPGe crystal, and the conductive guard ring being close to the first electrode and electrically insulated from the first electrode, and
   wherein a ratio of radius of the conductive guard ring to that of the guarded end face is less than or equal to 1/3.

2. The high purity germanium detector according to claim 1, wherein the conductive guard ring is arranged in a groove in the intrinsic region exposed surface, the groove surrounding the first electrode.

3. The HPGe detector according to claim 2, wherein the groove has a width less than 200 micrometers.

4. The HPGe detector according to claim 2, wherein the groove has a depth between 1 micrometer and 10 micrometers.

5. The HPGe detector according to claim 2, wherein the conductive guard ring is a solid metal ring or a plated metal layer matching with the groove in size.

6. The HPGe detector according to claim 1, further comprising a preamplification circuit, wherein the conductive guard ring and a high resistance input of the preamplification circuit are electrically connected equipotentially to each other.

7. The HPGe detector according to claim 1, wherein the HPGe single crystal is an N-type HPGe single crystal or a P-type HPGe single crystal.

8. The HPGe detector according to claim 1, wherein the conductive guard ring has a center substantially in coincidence with the center of the end face.

9. The HPGe detector according to claim 1, wherein the conductive guard ring has the substantially same electric potential as the first electrode.

10. An HPGe detector, comprising:
    an HPGe single crystal having an intrinsic region exposed surface;
    a first electrode and a second electrode connected to a first contact electrode and a second contact electrode of the HPGe single crystal respectively; and
    a conductive guard ring arranged in the intrinsic region exposed surface around the first electrode to separate the intrinsic region exposed surface into an inner region and an outer region,
    wherein the HPGe single crystal is a plane type detector, and
    the intrinsic region exposed surface is an outer circumferential surface of the HPGe single crystal, the first electrode and the second electrode being connected to two end faces of the HPGe single crystal respectively, and the conductive guard ring being arranged on the outer circumferential surface, close to the first electrode and electrically insulated from the first electrode.

11. The HPGe detector according to claim 10, wherein the portion of the intrinsic region exposed surface between the conductive guard ring and the first electrode has an area which is less than or equal to 1/3 of a total area of the intrinsic region exposed surface.

12. The HPGe detector according to claim 10, wherein the conductive guard ring is substantially perpendicular to an axis of the HPGe single crystal.

* * * * *